May 26, 1964

C. B. ROGERS 3,134,603

TANK ENCLOSURE FOR A VEHICLE

Filed Feb. 26, 1962

INVENTOR
CYRIL B. ROGERS
BY
J. C. Wiesler
ATTORNEY

May 26, 1964

C. B. ROGERS 3,134,603

TANK ENCLOSURE FOR A VEHICLE

Filed Feb. 26, 1962

INVENTOR
CYRIL B. ROGERS

BY *J. C. Wiesler*

ATTORNEY

United States Patent Office

3,134,603
Patented May 26, 1964

3,134,603
TANK ENCLOSURE FOR A VEHICLE
Cyril B. Rogers, Battle Creek, Mich., assignor to Clark Equipment Company, a corporation of Michigan
Filed Feb. 26, 1962, Ser. No. 175,473
6 Claims. (Cl. 280—5)

This invention relates to a tank enclosure for vehicles, and more particularly to a body compartment for use in passenger vehicles for housing safely tanks of combustible material, such as liquefied petroleum gas.

It is a primary object of the present invention to provide in vehicles of the type contemplated an improved built-in body compartment for housing safely reservoirs of combustible material.

Another object of the invention is to provide a positive ventilation construction in compartments of the type contemplated, and to provide a construction of the ventilators such that foreign materials thrown from the adjacent wheel of a vehicle cannot obstruct the ventilation arrangement.

Another object of the invention is to provide a generally improved heavier-than-air gas compartment for use in over-the-road passenger vehicles for supplying combustible fluid to such devices as cooking stoves, water heaters and refrigeration devices.

Other objects and features of the invention will appear in view of the following description when taken in conjunction with the drawing wherein.

Figure 1:
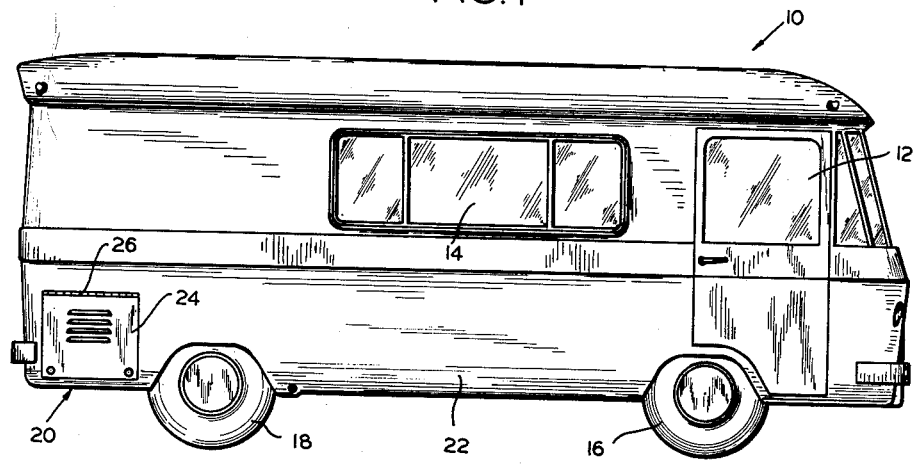
FIGURE 1 is a side view showing a camper type vehicle which embodies the present invention.

Referring now in detail to the drawing, an over-the-road vehicle is shown generally at numeral 10 for use with which the present invention is particularly well-suited. Vehicle 10, as illustrated, represents a camper-type vehicle which includes interiorly thereof all the necessary accouterments for living therein, such as sleeping, dining and riding space for passengers, and cooking, lavatory, refrigeration and hot water facilities.

Figure 2:
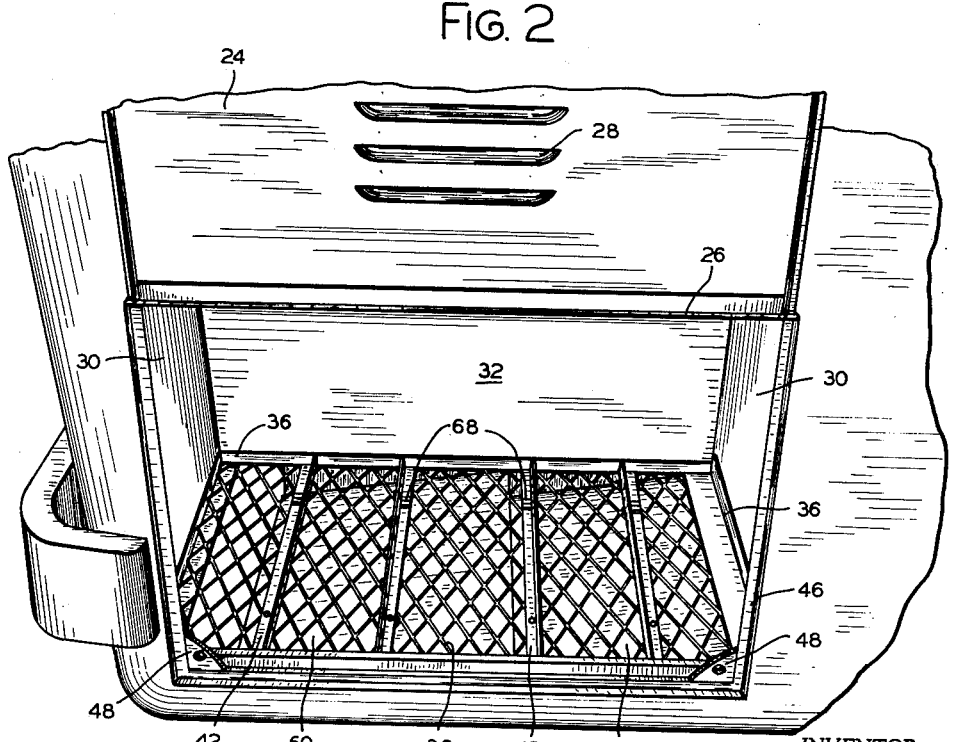
FIGURE 2 is an enlarged view in perspective of the rear-quarter section of the vehicle in FIG. 1 showing the compartment of the present invention.
Figure 3:
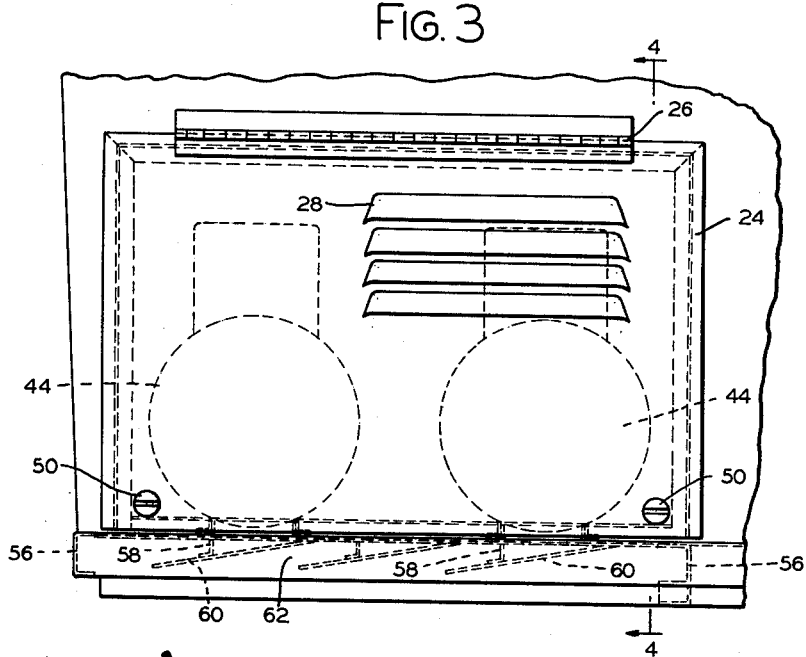
FIGURE 3 is a broken-away side view in elevation of the compartment shown in FIG. 2 with the liquefied gas tanks mounted in the compartment.
Figure 4:
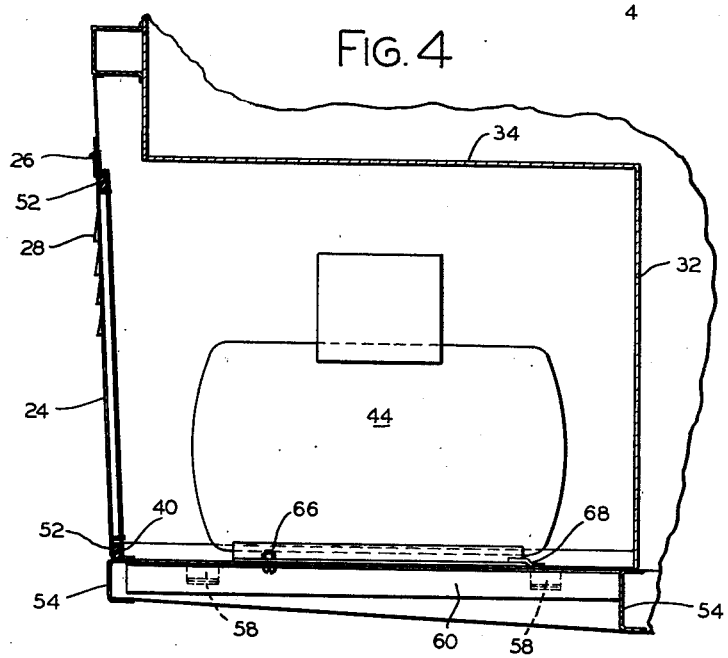
FIGURE 4 is a sectional view taken along line 4—4 of FIG. 3.
Figure 5:
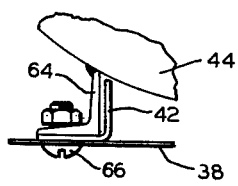
FIGURE 5 is a broken-away partial view showing one of the bracket mountings for one of the tanks.

The vehicle generally comprises an operator and passenger area 12, living space 14, front steering wheels 16, rear drive wheels 18, and a compartment area 20 located on the one side of the vehicle in the rear-quarter section thereof behind the adjacent drive wheel 18. The compartment is formed within body section 22 and comprises all-welded steel plate construction forming a cubicle-like construction to which access is provided only through an outer door 24 which is mounted on a horizontal hinge 26 of body portion 22 so that the compartment door can be swung from the closed position shown in FIGS. 1, 3 and 4 to the open position shown in FIG. 2. The door 24 is provided with a plurality of downwardly opening louvers 28 for a purpose to be described. The interior welded plate construction includes transverse spaced vertical plates 30, a longitudinal plate 32 and an upper plate construction 34, all such plates being welded to each other and to the body portion 22 in order to form a compartment within the body of the vehicle which is completely sealed-off from all other interior portions of the vehicle. Reinforcing strips 36 are secured along the lower boundaries of the plates 30 and 32, to which a wide-mesh screen 38 is suitably attached. Another longitudinal strip 40 extends across the lower and outer side boundary of the compartment, pairs of L-shaped tank mounting members 42 being secured to strips 36 and 40 in spaced relation adapted to receive a pair of liquefied petroleum gas or other suitable heavier-than-air gas tanks 44. A U-shaped recess 46 is formed adjacent the outer skin of body portion 22 to form a door sash for receiving compartment cover 24 in flush relation to body portion 22 when it is closed, gussets 48 being secured in the lower corners of recess 46 and having openings therein for the reception of bolts 50 which hold the compartment cover securely in position when it is closed. A resilient member 52 is provided in the cover construction to minimize vibration and the like. Longitudinal and transverse vehicle body frame members 54 and 56 box in the under-floor portion of the compartment, and L-shaped brackets 58 are secured, as by welding, to rearwardly and downwardly extending louver plates 60, the brackets being hung from the transverse rails 42 or the screen 38, as desired. Louver plates 60 span the compartment transversely thereof and overlap each other longitudinally thereof to provide substantial openings 62 therebetween.

Tanks 44 are located in position on L-shaped rail members 42 by means of complementary L-shaped rail members 64 which are welded to opposite sides of each tank and provide with rail members 42 alignable openings for receiving a nut and bolt 66 adjacent the outer ends of the rails while the rearward ends of rails 64 are received within generally Z-shaped brackets 68 adjacent the rearward ends of rails 42. If desired, the rail construction 42 can be raised somewhat so as to clear the longitudinal strip between gussets 48 so that the rails 64 may slidingly traverse rails 42 entirely along rails 42 and the tanks need not be partially lifted to clear said raised strip during mounting and dismounting of the tanks from the compartment before and after filling thereof.

In operation, tanks 44 are filled with liquefied petroleum or other suitable combustible heavier-than-air gas and are mounted in position on rails 42 with the rearward ends of rails 64 located beneath brackets 68 and the forward ends bolted to rails 42 by bolts 66. Cover 24 is then swung into closed position and bolted shut by bolts 50 in sealing relation with U-shaped recess sash 46, tanks 44 being connected by conduits, not shown, to various appliances within vehicle 10 (such as a hot water tank, a stove and a refrigerator). Such conduits extend downwardly through screen 38 and louvers 60 under the vehicle, and thence upwardly through the vehicle floor at a convenient location for connection to such appliances. This type of connection provides a low point outside the vehicle body for safety purposes in the event of leakage or damage in the heavier-than-air system. Valve means provided at each appliance controls the flow of gaseous medium thereto from the tanks. The tanks are thus completely sealed off from the interior of the vehicle except, of course through the appliance connected conduits.

In the event any leakage of the heavier-than-air gas should occur within the tank compartment, louvers 28 and 60 cooperate to provide an air washing action on the gas and purge the gas through openings 62. It will be noted that louvers 28 are formed in cover 24 such that they open into the compartment above tanks 44 whereby to provide a continuous washing down effect of any gas which may have escaped into the compartment by means of a positive air flow from louvers 28 through louvers 60, thus purging any such gas from the compartment into the atmosphere. This effect occurs whether the vehicle is at rest or in motion, and while in motion the volume flow of air through the compartment is increased as a result of the air flow effect past louvers 60 toward the rear of the vehicle tending to create a partial vacuum within the compartment which causes a continuous and substantial volume of atmospheric air to flow therethrough. The compartment is so constructed that no low recess pockets of any kind exist in which it is possible for the heavier-than-air gas to collect, and the lovers 60 are further formed with substantial openings 62 therebetween so positioned relative to drive wheel 18 that the wheel cannot in operation cause a plugging up of openings 62 as a result of slush, road dirt, and the like. In this respect, it will be noted that the compartment is preferably located rearwardly of wheel 18.

Although only one embodiment of my invention has been illustrated and described, it will be apparent to those skilled in the art that modifications in the structure and relative arrangement of parts may be made to suit individual requirements without necessarily departing from the scope of the invention.

I claim:

1. In vehicles of the type described, a heavier-than-air fluid tank compartment formed within the body of the vehicle comprising a plurality of interconnected wall members separating said compartment from the interior of the vehicle and including a floor portion forming a plurality of openings therein for communicating said compartment with the atmosphere, said floor portion including means for mounting a fluid tank in said compartment, a plurality of rearwardly and downwardly extending louver plates beneath said floor portion forming passageways for the flow of air and other fluid rearwardly and beneath the vehicle, said louver plates being constructed and arranged such that forward motion of the vehicle produces a flow of air past the louver plates which tends to partially evacuate the compartment, and cover means for opening and closing one side of said compartment mounted on one side of the body of the vehicle and having an upwardly directed opening formed therein for providing a flow of atmospheric air upwardly through said latter opening into the compartment and thence downwardly in the compartment through the passageways formed by said louver plates.

2. A combination as claimed in claim 1 wherein a fluid tank is mounted on said floor portion, said opening in the cover means being located above said tank and adapted to direct the flow of air therethrough upwardly in said compartment to produce with said louver passageways circulation of air within said compartment to continuously purge therefrom through said louvered passageways any gaseous fluid escaping into the compartment from said tank.

3. A combination as claimed in claim 1 wherein a fluid tank is mounted in the floor portion, and conduit means for connecting the tank to an appliance within the vehicle, said conduit means extending downwardly through the floor portion and thence upwardly into the interior of the vehicle for connection to the appliance.

4. A combination as claimed in claim 1 wherein said louver plates span said floor portion, said compartment being located rearwardly of a rear wheel of the vehicle.

5. A combination as claimed in claim 1 wherein said floor portion comprises an open mesh-like construction, and rail members spanning the floor portion and adapted to receive in secured relation thereto a heavier-than-air fluid tank.

6. A combination as claimed in claim 1 wherein said tank mounting means comprises a pair of L-shaped rail members, a fluid tank adapted to be secured to said rail members, a pair of complementary L-shaped rail members welded to opposite sides of the tank and supported on the first-mentioned L-shaped rail members, and means for connecting said pairs of rail members together for securing said tank within the compartment.

References Cited in the file of this patent

UNITED STATES PATENTS

| 1,969,172 | Fageol | Aug. 7, 1934 |
| 1,989,940 | McGaughan et al. | Feb. 5, 1935 |

FOREIGN PATENTS

| 304,833 | Great Britain | Jan. 28, 1929 |
| 422,095 | Great Britain | Jan. 4, 1935 |
| 531,647 | Great Britain | Jan. 8, 1941 |
| 552,153 | Great Britain | Mar. 25, 1943 |